United States Patent [19]  [11] 4,282,545
Bragas  [45] Aug. 4, 1981

[54] METHOD AND APPARATUS FOR PLAYING BACK COLOR VIDEO RECORDS THROUGH TELEVISION RECEIVER OPERATING AT A DIFFERENT COLOR STANDARD

[75] Inventor: Peter Bragas, Hildesheim-Itzum, Fed. Rep. of Germany

[73] Assignee: Blaupunkt-Werke GmbH, Hildesheim, Fed. Rep. of Germany

[21] Appl. No.: 42,576
[22] Filed: May 25, 1979

[30] Foreign Application Priority Data
Jun. 8, 1978 [DE] Fed. Rep. of Germany ....... 2825120

[51] Int. Cl.³ .......................... H04N 5/76; H04N 5/02
[52] U.S. Cl. .......................................... 358/4; 358/11
[58] Field of Search ..................... 358/4, 11; 360/9, 36

[56] References Cited
U.S. PATENT DOCUMENTS
3,917,415  11/1975  Eguchi ..................................... 358/4
4,148,077  4/1979   Bragas ..................................... 360/10
4,188,638  2/1980   de Haan .................................. 358/4

Primary Examiner—Bernard Konick
Assistant Examiner—Donald McElheny, Jr.
Attorney, Agent, or Firm—Frishauf, Holtz, Goodman & Woodward

[57] ABSTRACT

An NTSC color television signal picked up from a disc recording is mixed in such a way as to provide one sideband having the chrominance carrier at the PAL standard frequency and another sideband at a higher frequency which can be stepped down in a second mixer to the PAL color-carrier frequency to provide a side band shifted 180° in phase with respect to the color signal provided by the lower sideband of the first mixer. The mixing frequencies are kept in step by utilizing a standard frequency generator at the PAL color-carrier frequency which controls the phase of a VCO supplying a first mixing frequency in a third mixer from the output of which the second harmonic of the difference frequency is selected as the mixing frequency for the second mixer. From the standard frequency output there are also derived the phase-shifted color burst pulses for identifying the two chrominance signals produced as they are alternately utilized for the output PAL signal. A delay of one line scanning period allows the use of the delayed and undelayed signals to give the effect of a comb filter for the luminance signals and for the chrominance signal, and the delay line is also used in connection with a video switch and disturbance detector to allow use of the last undisturbed line when an unusable line is detected. The playback speed is slightly reduced (cf. U.S. Pat. No. 4,148,077) for reproduction by a television receiver operating at the European line-scanning frequency.

13 Claims, 3 Drawing Figures

METHOD AND APPARATUS FOR PLAYING BACK COLOR VIDEO RECORDS THROUGH TELEVISION RECEIVER OPERATING AT A DIFFERENT COLOR STANDARD

The present invention concerns the playing back of color television signals recorded in accordance with one color television standard through a television receiver operating in accordance with another color television standard, and particularly for the case in which the color television signal produced in accordance with the NTSC standard has been recorded and is to be played back by a television receiver operating in accordance with the PAL standard or in accordance with the PAL-M standard. In the first of these cases just mentioned, a change in the line scanning frequency is also involved.

BACKGROUND AND PRIOR ART

Such a method and apparatus requires that the video signal and at least one audio channel signal should be separately detected and that the detected video signal should have its luminance and chrominance components separated and separately treated, with the latter being shifted in frequency and otherwise treated to meet the requirements of the PAL color standard.

In my prior patent, U.S. Pat No. 4,148,077, a method is described for playing back black-and-white television signals for display at a slightly different line scanning frequency. By the system there disclosed, for example, television signals in accordance with the U.S. standard on a disc or a tape can be so played back that the signals picked up are suitable for a receiver designed in accordance with another standard, for example, Gerber standard. For this purpose it is necessary only to adjust the playback record speed (e.g., the rate of rotation of the turn table in the case of a disc record), so that the line-scanning frequency of the Gerber standard is provided in the reproduced signal.

Since the line-scanning frequencies of the two standards just mentioned lie very close to each other, the resulting picture field frequency with which the television receiver must be able to work varies only unsubstantially from the picture field frequency of the U.S. standard. In the case of modern television receivers, there is frequently no need whatever to get into the circuits of the receiver for modifications for such playback, since the range within which the deflection circuits can be synchronized can easily be, and often is, sufficiently wide so that the circuits can be synchronized to a picture field frequency of nearly 60 Hz, even though the receiver was intended to be used at the 50 Hz picture field frequency.

A more reliable operation is, nevertheless, obtained if the television receiver has switchable deflection circuits, with a switch position corresponding to each of the picture field frequencies to be used. It has been found that television signals recorded according to the U.S. standard can, in this way, be reproduced without difficulty in modern television receivers designed for use in accordance with the European television standard, but this success has, heretofore, been subject to the limitation that only black-and-white reproduction was involved. The different type of color encoding according to the U.S. standard (NTSC-standard) and the PAL standard utilized in most European countries permits no direct color reproduction, while American color television recording with European PAL television receivers.

It is an object of the present invention to provide a simple method and convenient apparatus by which it is possible to reproduce NTSC color television signals in television receivers equipped for reception of PAL signals, without the requirement of decoding and re-encoding the color signal.

SUMMARY OF THE INVENTION

Briefly, the chrominance signal separated from the picked-up composite video signal is mixed with a suitable frequency to produce not only one but two separate side bands with the desired shift in carrier frequency so that a second selectable color line is made available, the frequency of the color carrier of this second side band being brought, by mixing, to coincide with the frequency of the color carrier of the first side band, which corresponds to the PAL standard color carrier frequency; after phase synchronization with the horizontal synchronizing pulses, a PAL color synchronizing pulse is generated by a frequency standard and the color carrier frequency by splitting the pulses into components respectively shifted by $+45°$ and $-45°$, which are respectively added to the two color side bands, and, finally, a PAL switch, switching over at half the line scanning frequency, supplies alternately the color signal of the first color line and the color signal of the second color line for addition to the luminance signal.

This invention makes it possible to complete the system of previous invention already referred to, so that not only black-and-white reproduction of U.S. standard recorded television signals is possible on European receivers operating in accordance with the Gerber standard, but, also, NTSC color signals can be reproduced on a PAL color television receiver with only small adjustments or modifications of the playback device. It should be emphasized that this is accomplished by the present invention without requiring the use of a dual standard receiver or a playback device incorporating a complete color decoding of the NTSC signal and re-encoding of a PAL color signal.

The advantages thus obtainable are particularly that the records produced for the largest market which are recorded according to the NTSC standards are now usable at the same time for the market established by the PAL standard of color television. It should also be mentioned that the video disc systems that are now known provide two audio channels, so that the disc records can simultaneously provide a program in two languages, for example, with a first audio channel for an English-language audience and the second for a German-language audience, the two groups of viewers being, for example, located in separate rooms if it is desired to avoid the use of headphones for the sound channel. It is clear that the present invention will have advantages and applications going beyond those of the example just mentioned.

In a preferred form of the invention, the signal is taken from a frequency standard operating at the desired color-carrier frequency $f_{CP}$ and is synchronized by means of an adjustable phase shifter and a gating stage triggered by pulses of the line-scanning frequency, preferably burst gate pulses. In this manner the necessary synchronization, which would otherwise be complicated and very expensive, can be carried out very simply and at low cost.

For reasons for freedom from interference and reduction of the expense of multiple stages, it is advantageous to blank out the NTSC color-synchronizing pulses contained in the picked up and demodulated video signals. The chrominance signal then added to the luminance signal will contain only the PAL color-synchronizing pulse that are phase shifted alternately by $+45°$ or by $-45°$ ("wobble burst").

The mixing frequency fM2 used for converting the color carrier for the second side band to accord with the PAL color-carrier frequency can be obtained in a simple way by mixing the frequency fCP of the frequency standard and the first mixing frequency fM1 applied to the demodulated video signal which utilization of the second harmonic of the difference frequency obtained in the (second) mixing step. In this way it is assured that this mixing frequency does not need to be synchronized with the other frequencies and, nevertheless, provides an exact conversion of the color-carrier signal in the second side band.

The apparatus of the invention, briefly described, comprises a playback device covering a variable record speed drive, a delay line that together with subtraction and addition stages on its output side operates as a comb filter for the chrominance signal and the luminance signal, a chrominance stage having two parallel branches, in the first of which is provided a band-pass filter tuned to the PAL color-carrier frequency and the second of which contains a first band-pass filter tuned to the color-carrier frequency in the second side band, a second band pass filter tuned to the PAL color-carrier frequency, and between these two band-pass filters a mixing stage for converting the output signal of the first band-pass filter to the pass band of the second band-pass filter, and, finally, an addition stage with a first input at which the signals of both branches of the chrominance stage are alternately presented through a change-over switch operating at half the line-scanning frequency, and a second input at which the luminance signal is applied.

The circuit of the apparatus just described can be constituted particularly simply and economically if the following circuit stages are provided for generating the necessary mixing frequencies:

a standard frequency generator for the PAL color-carrier frequency, a controlled oscillator for converting color signals separated from the composite television signal picked up from the record to the PAL color-carrier frequency, a mixing stage to which the frequencies of the standard frequency generator and the controlled oscillator are supplied and a band-pass filter tuned to the second harmonic of the differences of those two frequencies and having its output connected with one input of the mixing stage in the second branch of the chrominance circuits or stage.

The "wobble burst" which is necessary for synchronizing the PAL color signal can be provided in a simple manner without much circuitry expense for synchronization if the output signal of the standard frequency generator is passed through a variable phase shift network and a keying, or gating, stage controlled by pulses of the line-scanning frequency, preferably burst-gate pulses, over to a phase splitter by which it is, in the right sequence, phase shifted by $+45°$ or $-45°$.

BRIEF DESCRIPTION OF THE DRAWINGS

The invention is further described by way of illustrative example with reference to the annexed drawings in which.

DESCRIPTION OF ILLUSTRATIVE EMBODIMENTS

Figure 1:
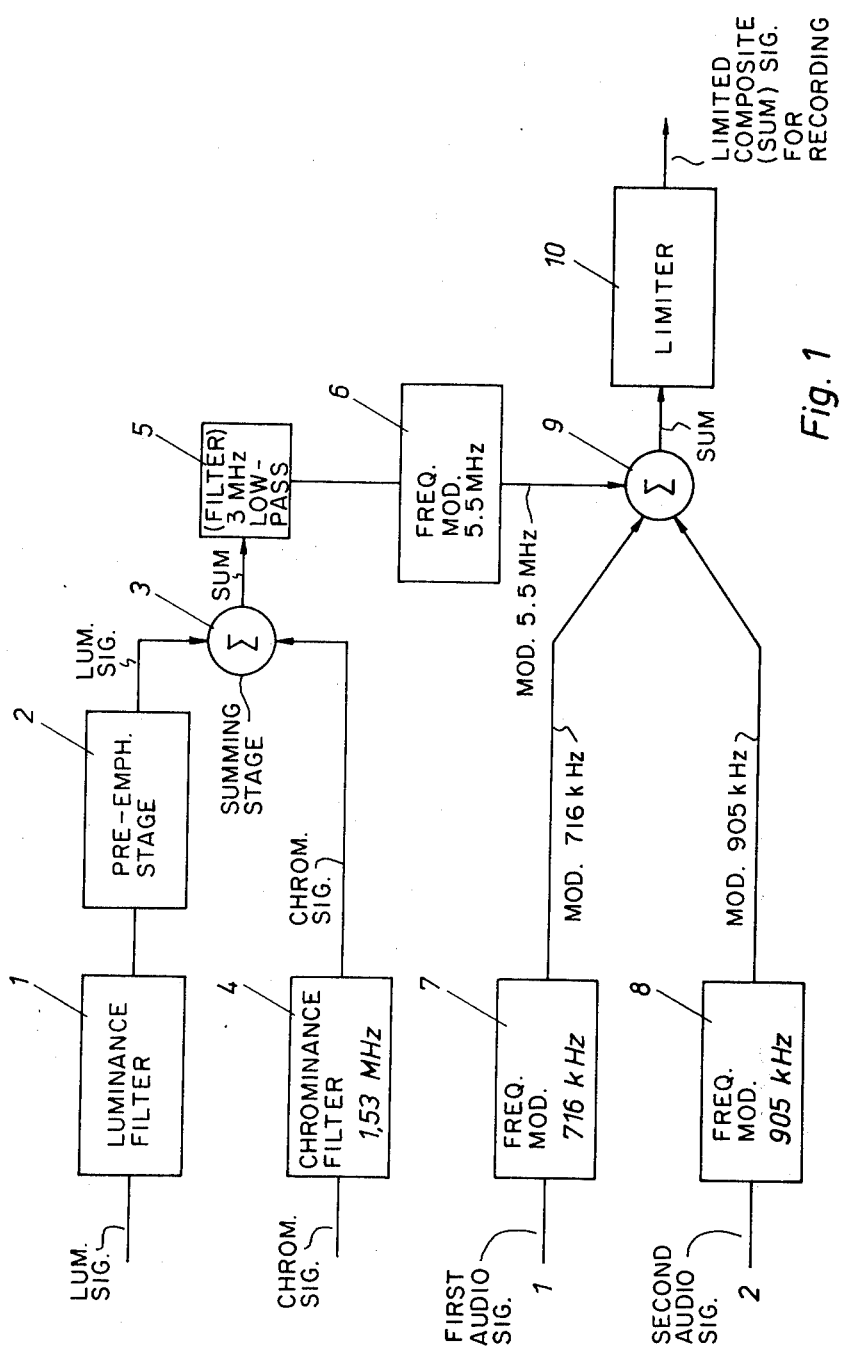
FIG. 1 is a block diagram of a circuit for which a signal recorded on a video disc may be encoded.

As shown in FIG. 1, the recording of a color television signal involves the separation of the decomposite signal into its various component signals, namely, the luminance signal, the chorminance signal, and at least one audio signal, in the illustrated case, two of the latter. The luminance signal is passed through a luminance filter 1 and a pre-emphasis stage 2, and supplied to one input of a summing stage 3 that has its second input connected to the output of the chrominance filter 4 to which the chrominance signals, which in the illustrated case of NTSC signal (U.S. standard) has a carrier of 1.53 MHz.

The output of the summing stage is furnished to a low pass filter 5 having a cutoff frequency of 3 MHz, the output of which goes to a frequency modulator 6 where it modulates a picture carrier for recording purposes, which carrier may, for example, be at 55 MHz. The first audio signal is supplied to a frequency modulator 7 where it modulates a carrier of a frequency of 716 KHz. The second audio signal is similary supplied to a frequency modulator 8, where it modulates the carrier of a frequency of 905 KHz.

The carrier frequencies for the chrominance signals and the two audio signals are chosen to be multiples of half the line-scanning frequency in order to avoid interference and cross-modulation. The output signals of the three frequency modulators (6, 7 and 8) are combined in a summing stage 9, after which they are passed through a limiter 10, and passed to a recording head (not shown in FIG. 1) for recording on a disc record.

DESCRIPTION OF PREFERRED ILLUSTRATIVE EMBODIMENTS

Figure 2:
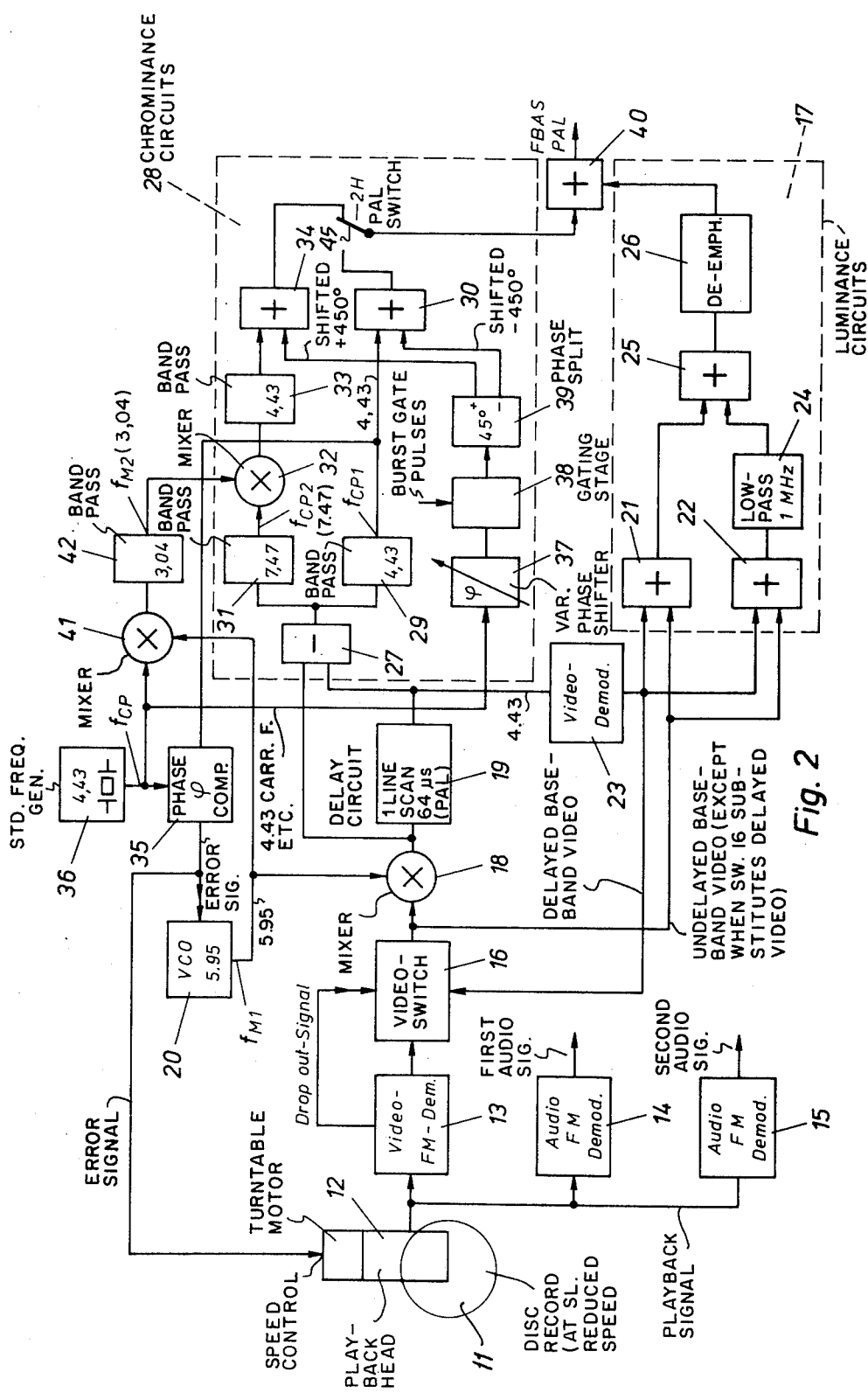
FIG. 2 is a circuit diagram of a first embodiment of playback apparatus according to the present invention for playing back NTSC signals through a PAL television receiver operating at the European line-scanning frequency.
Figure 3:
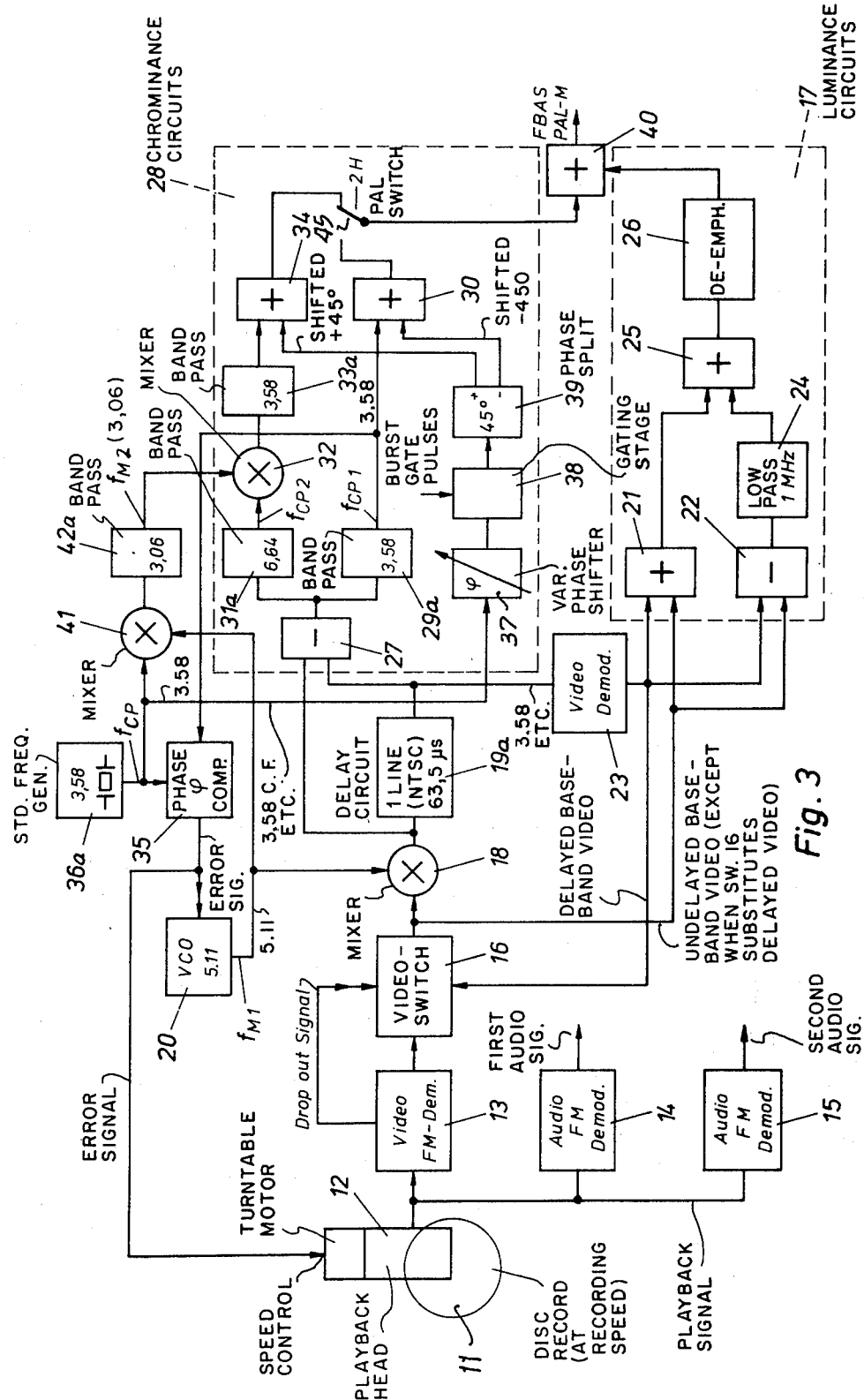
FIG. 3 is a block diagram of a circuit similar to that of FIG. 2 designed for playing back NTSC signals through a PAL television receiver operating at the western hemisphere line-scanning frequency.

The foregoing description of the recording process and apparatus would make clear function of the frequency demodulators 13, 14 and 15, in FIG. 2 and 3, to which are supplied in each case, in parallel, the signal picked up by the playback head 12 from the disc record 11. These frequency demodulators, of course, respond to the frequency modulators 6, 7 and 8 and provide at their respective outputs the video signal and the two audio signals in the form in which they were presented to the modulators 6, 7 and 8 in FIG. 1, the video signal, of course, being composed of a luminance signal and a chrominance signal, in the illustrated case, conforming to the NTSC standard.

The video signal thus demodulated by the video frequency demodulator 13 is passed through a video switch 16, the function of which is described further below and, thereafter, is supplied to the luminance circuits 17 on one hand, and to a first-mixer stage 18, where the chrominance signal, restored to its NTSC 1.53 MHz carrier frequency by the video-demodulator 13, is stepped up to the PAL color-carrier frequency of 4.43 MHz, and supplied through the chrominance circuit 28 both directly and through a delay line 19, which in FIG. 2 provides a delay of one line scanning period.

The video signal supplied to the mixing stage 18 is not excluded from the output, so that it is passed by the delay circuit 19 along with the mixing frequency and the side bands produced, filtering being provided in later stages as explained below.

The line scanning period in the case of PAL signals of the European standard is 64 μs; whereas the line scan frequency in the NTSC signal is 63.5 μs. The delay line 19 in FIG. 2 is designed for 64 μs since at the output of the playback apparatus illustrated in FIG. 2, a PAL signal meeting the requirements of the European standard should be made available. Keeping to the NTSC line scanning frequency would make this result impractical to reach. The rate of rotation in record 11 is slightly lower compared to the rate of rotation used in recording with the apparatus of FIG. 1, so that the picked-up signals will now have a line scanning frequency of 64 μs. This has the result that the frequency of the chrominance carrier is not now 1.53 MHz as in recording, but now only 1.52 MHz. Consequently, the mixing frequency FM1 supplied to the first mixing stage 18 must be 5.95 MHz in order that an output may be provided by this mixing stage at the PAL color-carrier frequency of 4.43 MHz (lower side band mixing).

The mixing frequency fM1 is generated in a voltage controlled oscillator 20.

The inputs of the luminance circuits 17 provided by the two inputs of an addition stage 21 and two of a substraction stage 22, each of the stages being provided on the one hand with the same signal that provided to the first mixer 18 and, on the other hand, the signal furnished by the output of the delay line 19 after demodulation by video demodulator 23, that demodulates the amplitude video signal coming out of the mixer 18 back to base band video. The output signal of the video demodulator 23 is also supplied to a second input of the video switch 16. The video switch 16 is controlled (gated) by a disturbance detector of a well-known type included in the circuitry of the FM demodulator 13, and operates to substitute the delayed video signal instead of the currently picked up video signal for supply to the first-mixer stage 18. The control connection is shown in FIG. 2, by the legend "drop-out signal" which is the common name for such a control.

It is, accordingly, to be noted that the delay line 19, in addition to serving for the purposes further described below, is also used for suppression of disturbing effects by substituting the last undisturbed line into the signal path in the event that the signal of the currently picked-up line is determined to be unusable by a conventional type of disturbance detector, as of the type described in "RCA Review Video Disc" from March 1978, for example.

The addition stage 21 and the substraction stage 22, together with the delay line 19, operate as a comb filter for the luminance signal. At the output of the substraction stage 22, however, a chrominance component is still contained in the signal. This is blocked out by means of a low-pass filter 24 having a cut-off frequency of 1 MHz. The respective outputs of the low-pass filter 24 and the addition stage 21 are connected to the input of an addition stage 25 which puts together the luminance signal freed from the chrominance component and supplies the signal to a de-emphasis stage 26 that compensates for the pre-emphasis performed in recording by the pre-emphasis stage 2 of FIG. 1. The original luminance signal, accordingly, is made available at the output of the de-emphasis stage 26.

The video signal appearing at the output of the first-mixer stage 18 is supplied undelayed to the first input of a substraction stage 27, and in delayed form, after passing through the delay line 19, to the second input of the substraction stage 27, which last forms a combined input signal for processing in the chrominance circuits 28. The substraction stage 27 operates together with the delay line 19 as a comb filter for the chrominance signal, so that at the output of the substraction stage, there are made available the color-carrier frequencies of both sidebands, produced in a first-mixer stage 18. Since the VCO 20 oscillates at a frequency of 5.95 MHz, the PAL color-carrier frequency of 4.43 MHz is produced in the lower sideband, and the color-carrier frequency of 7.47 MHz is produced in the upper sideband.

Following the subtraction stage 27 are provided two branch circuits connected in parallel, serving respectively for the processing of the lower and the upper side bands. The first branch contains merely a band pass filter 29 of the PAL color-carrier frequency of 4.43 MHz (fCP1) and an addition stage 30 receiving the output of that filter.

At the input of the second branch is a band-pass filter 31 tuned to the color-carrier frequency of 7.47 MHz (fCP2), which is followed by a second mixer stage 32. In the second mixer 32, the color carrier fCP2 is mixed with a mixing frequency fM2, and thereby converted down to the PAL color-carrier frequency of 4.43 MHz. In this circuit branch there is interposed, following the second mixer 32, a second band-pass filter 33 which passes the PAL color-carrier frequency. At the output of the second circuit branch is another addition stage 34 that corresponds to the addition stage 30 of the first branch of the chrominance circuits 28.

The regulation of the voltage-controlled oscillator 20 is performed by a phase comparison stage 35 which is supplied on one hand with the output signal of the band-pass filter 29, and on the other with the signal of a quartz-controlled standard frequency generator 36, operating at 4.43 MHz. The VCO 20 is regulated by the error signal produced at the output of the phase comparison stage 35 and provides a stabilized frequency inversion of the video signal in the first mixer 18. The error signal produced by the phase-comparison stage 35 is at the same time supplied to the pickup equipment 12 for compensating for slow changes in the conventional way, as described in "RCA Review Video Disc" from March 1978.

In the chrominance circuits described up to this point, the color signal with a carrier frequency of 4.43 MHz is produced in the second circuit branch that is shifted by 180° in phase compared to the color signal with the same carrier frequency provided in the first circuit branch. As is known, in the standard PAL signal, the color lines are alternately shifted back and forth in phase by 180°. Such a phase shift is not provided in the NTSC signal. It must, therefore, be specially produced.

This effect is provided in accordance with the invention by the fact that the second sideband produced upon mixing in the first mixing stage 18, which has a phase shift of 180° compared with the first sideband is utilized to produce a color signal shifted 180° in phase. Thus, at the output of the second branch of the chrominance circuits 18, a color signal is available shifted by 180° in phase with reference to the color signal available at the output of the first branch.

For identification of whether a phase shifted or not phase shifted color signal is being delivered, there is provided in the PAL signal a color synchronizing pulse or "burst" that is alternatingly shifted in phase by +45° and by −45°, the so-called "wobble burst." According to the invention, this is generated from the frequency standard 36 by the phase synchronization of burst gate pulses that are shifted in time relative to the horizontal synchronizing pulses. For that purpose, the output signal of the frequency standard 36 is supplied to a variable phase shift network 37, the output of which is supplied to a gating stage 38 which is gated by the burst gate pulses, obtained in the usual way by separating and delaying the line-sync-pulses, not shown in the drawing.

At the output of the gating stage 38, there is provided a signal if the phase shift through the phase shift network is so chosen that the signal provided at the output coincides with the burst gate pulses.

The signal passed by the gating stage 38 is supplied to a phase-splitting stage 39 in which the signal is shifted both by +45° and also −45° and supplied in those respective states to corresponding outputs. From one of these outputs the signal shifted by +45° supplied to the addition stage 34 in the second branch of the chrominance circuits and from the other the signal shifted by −45° is supplied to the addition stage 30 in the first branch of the chrominance circuits 38. In consequence, the color signal not shifted in phase is now identified by a −45° phase shifted synchronizing burst and the color signal shifted by 180° is identified by a +45° phase shifted synchronizing burst.

The switch 45 operating at half the line scanning frequency (commonly called the "2H PAL switch") alternately supplies the phase shifted and the unshifted color signals to an addition stage 40 to which another input is connected to the output signal of the de-emphasis stage 26 which supplies the luminance signal. In the output of the addition stage 40, there is accordingly available a complete PAL signal, commonly referred to as the FBAS signal in the PAL system, which can be supplied to a television receiver equipped for reception of PAL color television signals. In the FBAS signal provided at the output of the addition stage 40 differs from the standard PAL signal in that the picture-field frequency is 60 Hz instead of 50 Hz. The television receiver must, therefore, be capable of operating at a picture field frequency of 60 Hz. In the case of modern receivers, this capability is usually provided by the broad range of synchronization of the picture defelection circuits, but, of course, a receiver can also be provided which incorporates change-over switching, which may even be automatic, of the vertical deflection circuits between a picture field frequency of 60 Hz and one of 50 Hz.

The mixing frequency of fM2 supplied to the second-mixing stage 32 must make possible a very accurate conversion of the color-carrier of the second sideband of the required 4.43 MHz, synchronized with the color carrier in the first branch of the chrominance circuits 28. This is obtained by the provision of a third mixing stage 41 that mixes the output signal fCP of the frequency standard 36 with the output signal fM1 of the VCO 20, a band pass filter 42 being provided at the output of this third mixer 41, which filter is tuned to the second harmonic of the difference frequency of fCP-fM1 produced by the mixing process.

The necessary mixing frequency fM2 of 3.04 MHz is generated in step with the mixing frequency fM1, which itself is responsible for the generation of the color-carrier frequency of 4.43 MHz in the first branch of the chrominance circuits 28.

FIG. 3 is a block diagram similar to FIG. 2, illustrating the constitution of a playback apparatus for playing back NTS signals recorded on a disc record in a form conforming to the PAL-M standard that is used, for example, in South America. In that standard, the color coding is performed in accordance with the European PAL standard, except that the color carrier has a frequency of 3.58 MHz. The PAL-M standard also involves a further difference from the European PAL standard, in that not only is the picture field frequency 60 Hz instead of 50 Hz, but the requirements and value of the line-scanning frequency correspond to those of the NTSC standard instead of to those of the Gerber standard used in Europe.

In FIG. 3, therefore, the disc drive for the record 11, in contrast to that referred to in connection with FIG. 2, operates at the same speed as the recording speed (i.e., at normal speed) since the line-scanning frequency of the NTSC signal is to be preserved. The line-scanning period, accordingly, is not 64 μs as in the case of the European Pal signal, but rather 63.5 μs. The delay line 19a is therefore designed for, or set to, the delay time of 63.5 μs.

As the result of the different color-carrier frequency, the VCO 20a has a controlled frequency of 5.11 MHz and the frequency standard 36a has an output frequency of 3.58 MHz. Consequently the pass frequencies of the band pass filters are also different, namely, 3.58 MHz for the filter 29a, 6.64 MHz for the filter 31a, 3.58 MHz for the filter 33a, and 3.06 MHz for the filter 42a.

At the output of the addition stage 40 in FIG. 3, there is available in this case a fully conforming PAL-M signal so that no further conditions must be satisfied by any receiver designed for PAL-M reception that may be used.

It may thus be seen that by the present invention a method and apparatus is provided by which solftware produced in the U.S. for video playback, particularly for video disc playback, can be directly utilized for the reception of color television signals by television receivers designed to the different PAL standards.

Although the invention has been described with reference to two illustrative example, it will be recognized that further variation and modification may be made within the inventive concept.

I claim:

1. A method of playing back recorded NTSC-type color television signals through a television receiver designed for reception of PAL-type color television signals utilizing a record moving and signal pick-up device arranged to operate at a record speed set for the receiver's line-scanning frequency, comprising the steps of:

(a) demodulating the video signal picked up from a record;

(b) mixing the video signal so demodulated with a first sideband in which the color carrier (fCP1) has the color carrier frequency (fCP) for which said receiver is designed and also a second sideband from which a second color signal can be derived for line-by-line selection;

(c) mixing said second sideband with a second mixing frequency (fM2) to convert the color carrier (fCP2) of the second sideband to coincide in frequency with said color carrier (fCP1) of said first sideband;

(d) generating PAL color synchronizing pulses from the output of a standard frequency generator operating at said color-carrier frequency (fCP) for which said receiver is designed and from horizontal scan synchronizing pulses obtained from the picked-up signal, with phase-splitting of the burst pulses so produced into components respectively shifted in phase by +45° and −45°;

(e) adding said components of said color-synchronizing burst pulses respectively to said first and second sidebands having carrier frequencies of the same frequency; and (f) alternately selecting, with a switch operating at half the line scanning frequency, each of said color signals constituted respectively by said sidebands and the color synchronizing burst pulses respectively added thereto.

2. A method as defined in claim 1 in which the step of generating PAL color-synchronizing pulses includes the substep of passing the output (fCP) of said standard frequency generator (36) through an adjustable phase shifter (37) and a gating stage (38) gated by pulses of line-scanning frequency for synchronization and then subjecting the output of said synchronization stage (38) to phase splitting in order to provide separate outputs respectively shifted in phase by +45° and −45° with reference to the phase of the signals gated by said gating stage.

3. A method as defined in claim 2 in which said pulses of line-scanning frequency utilized for synchronization by operation of said gating stage (38) are burst gate pulses.

4. A method as defined in claim 1 including also the step of blanking out the color-synchronizing pulses present in the signal produced by said step of demodulating the video signal picked up from a record.

5. A method as defined in any one of claims 1-4 in which the following steps are performed for obtaining said second mixing frequency (fM2) for the second mixing step:

mixing the output frequency (fCP) of said standard frequency generator (36) with said first-mixing frequency (fM1) and selecting by means of a filter the second harmonic of the different frequency produced by the mixing just mentioned.

6. Apparatus for playing back recorded NTSC-type color television signals through a television receiver designed for the reception of PAL-type television signals utilizing and including a record-moving and signal-pickup device arranged to operate at a record speed set for the receiver's line-scanning frequency, further comprising:

means (13) for demodulating the video signal picked up from a record by said record-moving and signal-pickup device (12);

first mixing means (18) for mixing the video signal demodulated by said demodulating means with a first-mixing frequency (fM1) to produce a first sideband signal in which the color carrier (fCP1) has the color-carrier frequency (fCP) for which said receiver is designed, and also a second sideband signal means (29,29a; 31,31a) for separating said first and second sideband signals from each other for separate treatment;

second mixing means (32) for mixing said second sideband signal with a second mixing frequency (fM2) to convert the color carrier (fCP2) of said second sideband to coincide in frequency with said color carrier (fCP1) of said first sideband signal;

a standard frequency generator (36) operating at said color-carrier frequency (fCP) for which said receiver is designed;

means (35,20,41,42,42a) connected to the output of said standard frequency generator for deriving therefrom and maintaining in step with each other waves of said first and second mixing frequencies supplied to said first and second mixing means;

means (37,38,39) for deriving from the output of said standard frequency generator two sequences of color synchronizing burst pulses, one shifted in phase by +45° and one shifted in phase by −45° from synchronism with horizontal synchronizing pulses of said picked-up video signal and supply said pulse sequences, respectively, at two outputs;

means (30,34) for adding color burst pulses provided by the outputs of said color burst pulse deriving means, respectively, to said first sideband signals and to the output of said second mixer and providing, respectively, at two outputs the combinations of signals and burst pulses so produced;

switch means (45) for operating at half the line-scanning frequency of the signals produced by said demodulating means (13) for alternately selecting, as a signal for reception by said television receiver, the respective outputs of said adding means;

signal delay means (19), having a period equal to the line-scanning period of signals demodulated by said demodulating means (13), connected to the output of said first mixing means (18);

second video demodulating means (23) connected to the output of said delay means (19) for demodulating the video modulation of the output of said first mixing means (18) after delay by said delaying means;

first adding means (21) and a first subtracting circuit (22), each having an input connected to the output of said second demodulating means (23) and another input connected in parallel to the demodulated video signal input of said first mixing means (18);

second adding means (25) for adding the outputs of first adding means (21) and said first subtracting means (22) and thereby providing a comb-filtered luminance signal;

second subtracting means (27) having one input connected to the input of said first mixing means (18) and another connected to the output of said delaying means (19) and having an output connected to said sideband separating means (29,31; 29a,31a) for supplying comb-filtered chrominance signals thereto, and third addition means (40) for adding luminance signal derived from the output of said second adding means to the chrominance signal selected by said switch means and for applying these added signals together to said receiver.

7. Apparatus as defined in claim 6 in which there is interposed between said second adding means (25) and said third adding means (40) a de-emphasis stage (26) for compensating for pre-emphasis normally used in the recording of video signals.

8. Apparatus as defined in claim 6 in which there is interposed between said first subtracting means (22) and said second adding means (25) a low-pass filter (24) for suppressing chrominance signals.

9. Apparatus as defined in claim 6, comprising for the purpose of supplying said first-mixing frequency to said first-mixing means and said second-mixing frequency to said second mixing means, the following components:

the phase comparison circuit (35) having one input connected to the output of said standard frequency generator (36) and another input connected to said output of said means (29,29a) for separating said first sideband signal, for providing, as an output, an error signal;

a voltage-controlled oscillator having its control input connected to said error signal output of said base comparison circuit having an output at said first-mixing frequency (fM1) connected to said first-mixing means (18);

third mixing means (41) having one input connected to the output of said standard frequency generator (36) and another input connected to the output of said voltage-controlled oscillator (20); and bandpass filtering means (42,42a) for passing the second harmonic of the difference frequency produced by mixing the outputs of said standard frequency generator and said voltage-controlled oscillator for use of said second-mixing frequency (fM2), the output of said filtering means being connected to said mixing means (32).

10. Apparatus as defined in claim 6 in which said first-mentioned demodulating means (13) includes a device for producing a drop-out signal when the currently picked up line scan of said picked up signals fails to meet a predetermined standard of acceptability for reproduction and in which there is interposed between the output of said first-mentioned demodulating means and the input of said first-mixing means (18) a video selector switch (16) controlled by said drop-out signal and arranged for substituting the output of said second video demodulating means (23) for the output of said first-mentioned demodulating means (13) when said drop-out signal is present for supply to the input of said first modulating means and to an input of each of said first-adding and first-subtracting means.

11. Apparatus as defined in claim 10 in which the output of said phase comparison circuit (35) is connected also to said record-moving and pick-up device (12) for compensating for slow changes in frequencies picked up.

12. Apparatus as defined in claim 6 in which said color burst pulse deriving means comprise an adjustable phase shifter (37) connected to the output of said standard frequency generator (36), gating means (38) connected to the output of said phase shifter (37), and having a control input connected to a source of pulses having a repetition rate corresponding to the line-scanning frequency of the signals at the output of said first mentioned demodulating means (13) and phase splitting means (39) for providing a first output of color synchronizing burst pulses shifted in phase by +45° and a second output providing such burst pulses shifted in phase by −45°.

13. Apparatus as defined in claim 12 in which said gating means (38) as said control input thereof connected to a source of burst gating pulses synchronized with the horizontal synchronizing pulses of the signals at the output of said first-mentioned demodulating means (13).

* * * * *